United States Patent [19]
Gerrand et al.

[11] Patent Number: 5,875,681
[45] Date of Patent: Mar. 2, 1999

[54] MOTORIZED REDUCTION GEAR UNIT, IN PARTICULAR FOR DRIVING A SCREEN WIPER IN A MOTOR VEHICLE

[75] Inventors: Dominique Gerrand, Thure; Bruno Moreau, Quincay, both of France

[73] Assignee: Valeo Systemes D'Essuyage, La Verriere, France

[21] Appl. No.: 808,551

[22] Filed: Feb. 27, 1997

[30] Foreign Application Priority Data

Feb. 29, 1996 [FR] France ................................. 96 02574

[51] Int. Cl.⁶ .......................................................... F16H 1/16
[52] U.S. Cl. ................................................ 74/427; 310/83
[58] Field of Search .................... 74/410, 427; 15/250.3; 310/83

[56] References Cited

U.S. PATENT DOCUMENTS

| | | | |
|---|---|---|---|
| 1,165,829 | 12/1915 | Alquist | 74/410 |
| 4,369,387 | 1/1983 | Haar et al. | 310/83 |
| 4,444,071 | 4/1984 | Guichard | 74/427 |
| 4,754,660 | 7/1988 | Kobayashi et al. | 74/427 |
| 4,774,423 | 9/1988 | Karasawa et al. | 310/83 |
| 4,944,375 | 7/1990 | Ohta et al. | 15/250.3 |

FOREIGN PATENT DOCUMENTS

| | | |
|---|---|---|
| 2 449 006 | 9/1980 | France . |
| 2 455 221 | 11/1980 | France . |
| 2 492 027 | 4/1982 | France . |
| 2 507 276 | 12/1982 | France . |
| 2 102 911 | 2/1983 | United Kingdom . |

OTHER PUBLICATIONS

French Search Report dated 8 Nov. 1996.

*Primary Examiner*—Charles A Marmor
*Assistant Examiner*—David Fenstermacher
*Attorney, Agent, or Firm*—Morgan & Finnegan, L.L.P.

[57] ABSTRACT

A motor vehicle screen wiper drive unit is a motorized reduction gear unit comprising a reduction gear train between a driving shaft, driven by a motor, and a driven shaft. The gear train comprises at least one worm fixed to the driving shaft and meshing with a first set of teeth of an intermediate gear wheel. The latter also has a second set of teeth meshing with a driven gear wheel which is carried by the driven shaft. The second teeth of the intermediate gear wheel, and the teeth of the driven wheel, are generally helical, being so oriented that the driven wheel exerts an axial force urging the intermediate gear wheel in a direction opposite to that in which the worm is urged by an axial force exerted on the intermediate wheel by the worm. The need for rigid abutment means for the intermediate wheel is thereby avoided.

3 Claims, 2 Drawing Sheets

MOTORIZED REDUCTION GEAR UNIT, IN PARTICULAR FOR DRIVING A SCREEN WIPER IN A MOTOR VEHICLE

FIELD OF THE INVENTION

The present invention relates in general terms to motorised reduction gear units, especially those which constitute wiper drive units for screen wiper arms in a motor vehicle.

BACKGROUND OF THE INVENTION

It is known from French patent specification No. FR 2 455 221A to provide a motorised reduction gear unit which includes, between a driving shaft and a driven shaft (the driving shaft being driven by a motor and constituting for example the motor shaft itself), a geared transmission in the form of a reduction gear train, which includes at least one worm fixed to the said driving shaft and meshing with a first set of teeth of an intermediate gear wheel or pinion. A second set of teeth of the intermediate gear wheel meshes with a driven gear wheel or pinion which is fixed to and carried by the driven shaft. In that arrangement, the worm cooperates with a first set of teeth of the intermediate pinion, these teeth being helical. This results in the application of a force having a large axial component which urges the intermediate pinion in a direction such that it tends to be urged away from the plate element on which it is mounted for rotational movement.

As a result of this, in the arrangement disclosed in the above mentioned French patent specification, the reduction gear unit has a cover plate which serves as an abutment means to take the thrust resulting from the above mentioned axial component of force, thereby preventing any excessive displacement of the intermediate gear wheel in the direction of that force. This does however call for a cover plate which is robust and rigid enough for that purpose, so that it must be made of metal having a large enough thickness. This in turn increases the selling cost of the motorised reduction gear unit.

In addition, a finger is provided in cooperation with the intermediate gear wheel in order to make the abutting contact against the cover plate. This finger is an additional component which adds complication to the operation of assembling the motorised reduction gear unit, and again increases its selling cost.

DISCUSSION OF THE INVENTION

An object of the invention is to overcome the above mentioned drawbacks of the state of the art, and to provide a motorised reduction gear unit in which the cover plate no longer has to act as an abutment against any displacement of a gear wheel.

Another object is to enable the unit to be made more cheaply and with a reduction gear structure which is simplified.

A further object of the invention is to provide a motorised reduction gear unit which is less noisy in operation, and in which impact noise, bumps and bangs in operation are substantially attenuated.

According to the invention, a motorised reduction gear unit, especially for driving screen wiper arms of a motor vehicle, comprising, between a driving shaft which is driven by a motor and a driven shaft, transmission gearing which includes at least one worm fixed to the driving shaft and meshing with a first set of teeth of an intermediate gear wheel, while a second set of teeth of the intermediate gear wheel meshes with a driven gear wheel fixed to the driven shaft, is characterised in that the second set of teeth of the intermediate gear wheel and the teeth of the driven gear wheel are generally helical, with an orientation such that the driven gear wheel urges the intermediate gear wheel axially in a direction opposite to that of an axial force exerted by the worm on the said intermediate gear wheel.

According to a preferred feature of the invention, the first set of teeth of the intermediate gear wheel is also helical, defining a helix of opposite hand to that of its second set of teeth.

According to another preferred feature of the invention, the respective helix angles of the first and second sets of teeth of the intermediate gear wheel are selected to be such that the magnitude of the axial force exerted by the driven gear wheel on the intermediate gear wheel is greater than or equal to the amplitude of the axial force exerted by the worm on the intermediate gear wheel.

According to yet another preferred feature of the invention, the unit further includes a second intermediate gear wheel which has a first set of teeth meshing with a second worm which is fixed to the driving shaft, together with a helical second set of teeth meshing with the driven gear wheel.

Preferably, the first set of teeth of the said further intermediate gear wheel is also helical, defining a helix of the same hand as its second set of teeth.

Further features and advantages of the present invention will appear more clearly on a reading of the detailed description of some preferred embodiments of the invention, given below by way of non-limiting example only and with reference to the accompanying drawings.

DESCRIPTION OF PREFERRED EMBODIMENTS OF THE INVENTION

Figure 1:
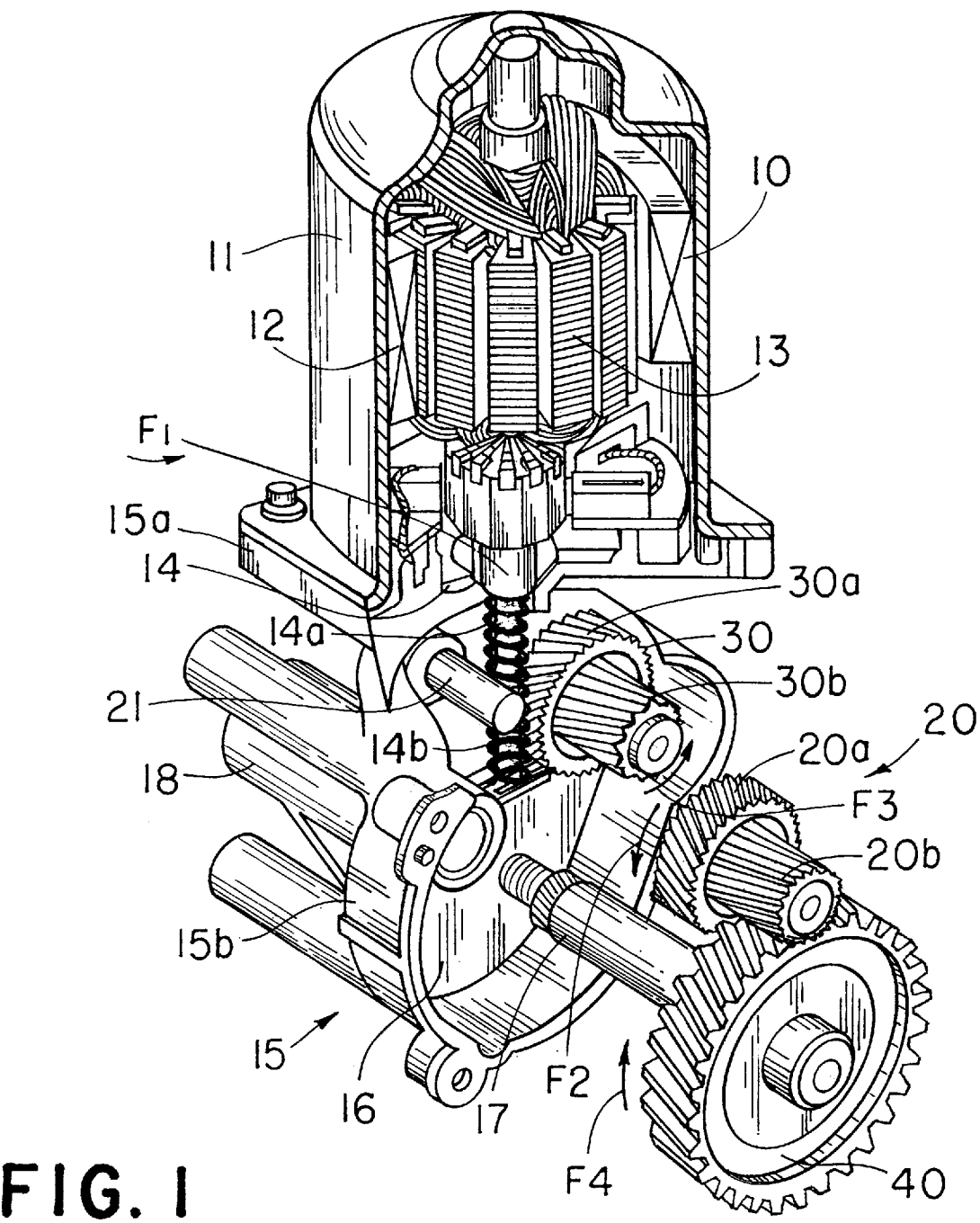
FIG. 1 is a perspective view, shown partly cut away and partly exploded, of part of a motorised reduction gear unit in accordance with the invention.

With reference to FIG. 1, this shows a motorised reduction gear unit, which in the present case is intended for driving screen wiper arms in a motor vehicle. The unit comprises an electric drive motor 10 mounted within a casing 11. The motor, which is a direct current motor, includes in the conventional way a stator 12 and a rotor 13, the rotor shaft 14 of which projects from the rotor and carries two adjacent worms 14a and 14b, which are of opposite hands and of the same pitch.

The motorised reduction gear unit also includes a base or body member 15 of a light alloy, which includes a first, or mounting, plate element 15a which is adapted to fit on the end portion of the stator of the motor, on the same side of the latter as the worms. The body 15 also includes a second plate element 15b, which is part of a casing of a reduction gear unit associated with the motor 10. This plate element 15b defines a housing 16 which is oriented in a general direction at right angles to the plane of the first plate element 15a. The rotor shaft, or output shaft, 14 of the motor, constituting a driving shaft, extends through the plate element 15a. The housing 16 contains the rotary motion transferring means, here in the form of reduction gearing, coupling the rotor shaft 14 to an output shaft 17 of the reduction gear unit. The output shaft 17 constitutes a driven shaft and extends through an elongate bearing 18 which is formed in the base of the housing 16.

The rotary gearing comprises the worms 14a and 14b, and an intermediate toothed wheel (gear wheel, pinion) 20, which is mounted for rotation on a bearing 21 defined by the second plate element 15b. The gear wheel 20 has a first set of teeth 20a and a second set of teeth 20b coaxial with the set 20a. The first set of teeth 20a, which is of a larger diameter than the other set, cooperates with the worm 14a, which is closer to the rotor 13 of the motor than is the other worm 14b. A second intermediate gear wheel 30, which is identical to the wheel 20, is mounted in the same way on a bearing 31. A first set of teeth 30a of the gear wheel 30 cooperates with the other worm 14b on the output shaft of the motor. In the manner known per se, the sets of teeth 20a and 30a that cooperate with the two worms 14a and 14b, are helical. They are of opposite hands, i.e. their respective helixes extend in opposite senses.

The second sets of teeth 20b and 30b of the gear wheels 20 and 30 respectively (the wheel 30 having a smaller diameter than the wheel 20) mesh with the set of peripheral teeth of a driven gear wheel 40 which is fixed to the output shaft 17 of the motorised reduction gear unit.

The second teeth 20b and 30b of the gear wheels 20 and 30, and therefore the teeth on the gear wheel 40, are all helical teeth, and the teeth 20b have the same orientation (i.e. the same handing) as the teeth 30b. It will therefore be observed that on the gear wheel 30, the sense or hand of the helix of the sets of teeth 30 and 30a is the same, while on the gear wheel 20, the helixes defining the two sets of teeth 20a and 20b are of opposite hands.

The behaviour of the motorised reduction gear unit, in terms of axial applied forces, will now be described. The meshing of the worm 14b with the set of teeth 30a of the gear wheel 30, having regard to the orientation of this set of teeth and having regard also to the direction of rotation of the output shaft 14, as indicated by the arrow F1, exerts on the gear wheel 30 an applied force having an axial component which tends to maintain the wheel 30 against the plate element 15b. The gear wheel 30 rotates in the direction indicated by the arrow F3.

At the same time, the set of helical teeth 30b, by driving the gear wheel 40 in the direction indicated by the arrow F4, subjects the gear wheel 30 to a reaction force having an axial component in the same direction. The gear wheel 30 is thus generally subjected to two axial forces in that direction, which prevents the latter from being displaced away from the plate element 15b. Meshing of the worm 14a with the set of teeth 20a on the gear wheel 20, so as to drive the latter in rotation in the direction indicated by the arrow F2, applies a force having an axial component which tends to displace the gear wheel 20 away from the plate element 15b. At the same time, the set of helical teeth 20b that drives the gear wheel 40 (in the same way as the teeth 30b drive the gear wheel 30) subjects the wheel 20 to a reaction force having an axial component in the opposite direction from that exerted by the worm 14a on the teeth 20a.

It will therefore be understood that these two axial forces balance each other out. Thus, by suitable choice of helix angle for the teeth 20b and 30b of the gear wheels 20 and 30, and the corresponding helix angle of the teeth on the wheel 40, it can be arranged that the reaction force which is exerted by the gear wheel 40 on the wheel 20 has a magnitude which is at least equal to, and which is preferably slightly greater than, the force which is exerted by the worm 14. As a result, the axial component which is generally exerted on the wheel 20 tends to hold the latter against the plate element 15b. As a consequence, the abutment means which are provided in the arrangement disclosed in French patent specification No. FR 2 455 221A, mentioned above, can be omitted, and this affords a substantial simplification in the construction of the motorised reduction gear unit.

In addition, and by contrast with the above mentioned French patent specification, the cover plate element 50 which covers the plate element 15b does not have to act as an abutment for any gear wheel. Therefore its robustness and rigidity are no longer critical in this regard. This means that the cover plate element can, in particular, be made of a suitable moulded plastics material, which reduces the overall cost of the motorised reduction gear unit.

It is also important to note that the fact that helical teeth are used for the second sets 20b and 30b in the gear wheels 20 and 30, and also for the teeth of the gear wheel 40, enables operating noises to be substantially reduced. It also tends to reduce shocks or impacts, especially during starting and stopping of the reduction gear unit, because of the increase in the progressiveness of the cooperation between the various teeth.

Finally, it will be noted that the form of the second teeth in the gear wheels 20 and 30, and that of the teeth in the gear wheel 40, leads to improved mechanical strength, because of the resulting increase in the tooth surface areas that are in cooperation in shear.

Figure 2:
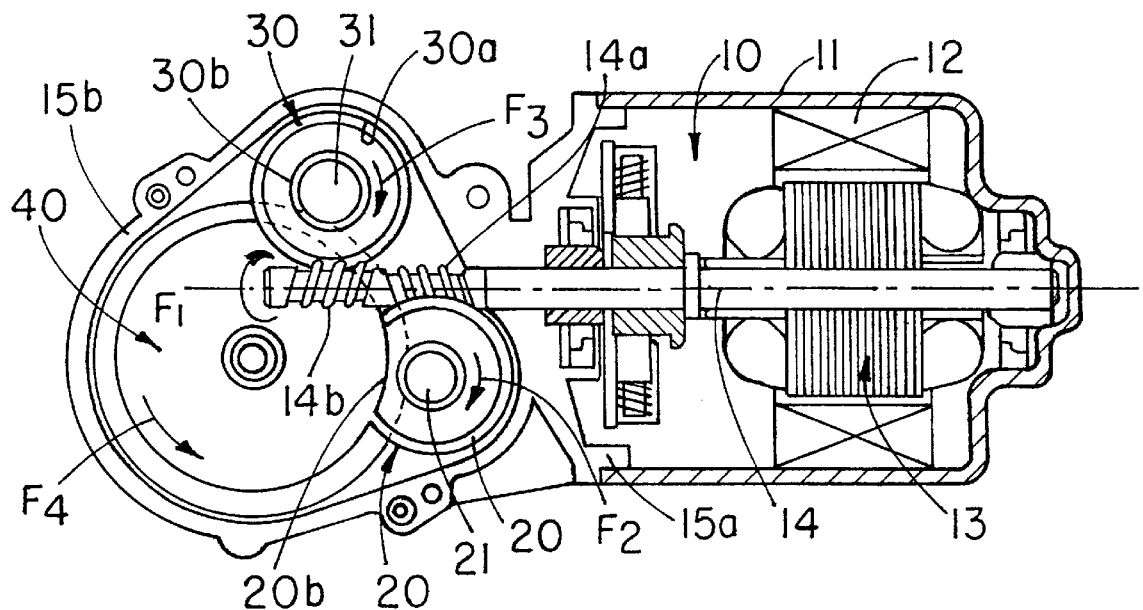
FIG. 2 is a front view, shown partly in plan and partly in cross section, of the motorised reduction gear unit of FIG. 1, with directions of rotation and tooth handing reversed.
Figure 3:
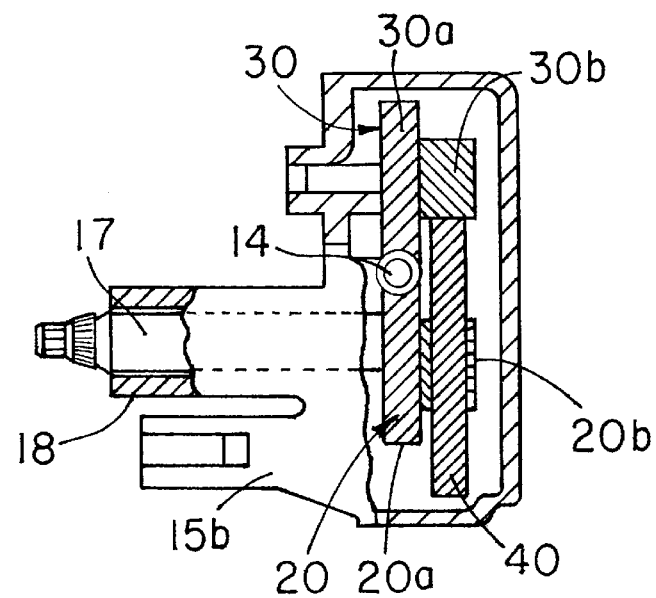
FIG. 3 is a profile view, shown partly in plan and partly in cross section, of the motorised reduction gear unit of FIG. 2.

The disposition of the arrangement can of course be made symmetrical with respect to that which is shown in FIG. 1, and this symmetrical, or reversed, arrangement is shown diagrammatically in FIGS. 2 and 3.

The present invention is not in any way limited to the embodiments described above and shown in the drawings; the person in the art will be able to conceive any modification or other version which conforms to the spirit of the invention.

What is claimed is:

1. A motorized reduction gear unit for a motor vehicle screen wiper, having a case and a removable cover plate, a motor having a motor shaft, a driven shaft, and reduction gearing coupling the driven shaft to the motor shaft, wherein the motorized reduction gear unit comprises:

a worm carried by the motor shaft; an intermediate gear wheel having a first set of teeth meshing with the worm, and a second set of teeth; and a driven gear wheel carried by the driven shaft and having a third set of teeth meshing with said second set of teeth, wherein the worm exerts on the intermediate wheel an axial force in a first direction, and wherein the first, second and third sets of teeth are helical and are so oriented that the helixes of the first and second sets of teeth are of opposite hands and the driven wheel applies an axial force to the intermediate wheel in a second direction opposed to the first direction, and wherein the respective helix angles of the first and second sets of teeth of the intermediate wheel selectively impose predetermined axial forces on the gear wheels to prevent displacement of the gear wheels whereby the removable cover plate is not used as an abutment to the gear wheels.

2. A unit according to claim 1, further including a second worm carried by the motor shaft, and a second intermediate gear wheel having a fourth set of teeth meshing with the second worm, the second intermediate wheel further having a helical fifth set of teeth meshing with the said driven wheel.

3. A unit according to claim 2 wherein the first set of teeth are helical, the helixes of the first and second sets of teeth being of opposite hands, the fourth set of teeth being helical, said fourth and fifth sets of teeth being of the same hand.

* * * * *